(12) United States Patent
Lasky et al.

(10) Patent No.: US 9,460,184 B2
(45) Date of Patent: *Oct. 4, 2016

(54) APPLICATION OF A DIFFERENTIAL DATASET TO A DATA STORE USING SEQUENTIAL CHANGE SETS

(71) Applicant: Microsoft Technology Licensing, LLC, Redmond, WA (US)

(72) Inventors: Michael Lasky, Highland, UT (US); Matthew Ryan, Spanish Fork, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,003

(22) Filed: Feb. 20, 2014

(65) Prior Publication Data
US 2014/0172791 A1 Jun. 19, 2014

Related U.S. Application Data

(63) Continuation of application No. 13/275,957, filed on Oct. 18, 2011, now Pat. No. 8,676,757.

(51) Int. Cl.
G06F 17/30 (2006.01)
G06F 11/14 (2006.01)

(52) U.S. Cl.
CPC ..... G06F 17/30581 (2013.01); G06F 11/1451 (2013.01); G06F 11/1471 (2013.01); G06F 17/30174 (2013.01)

(58) Field of Classification Search
CPC .............. G06F 17/30286; G06F 17/30289; G06F 17/30292; G06F 17/30581
USPC ........................................................ 707/624
See application file for complete search history.

(56) References Cited

U.S. PATENT DOCUMENTS

| | | | |
|---|---|---|---|
| 6,295,541 B1 * | 9/2001 | Bodnar et al. | |
| 6,560,700 B1 * | 5/2003 | Birkler et al. | 713/1 |
| 6,999,977 B1 | 2/2006 | Norcott et al. | |
| 7,107,297 B2 | 9/2006 | Yellepeddy et al. | |
| 7,756,833 B2 | 7/2010 | Van Ingen et al. | |
| 8,676,757 B2 | 3/2014 | Lasky et al. | |
| 2002/0194205 A1 * | 12/2002 | Brown et al. | 707/200 |
| 2005/0193031 A1 | 9/2005 | Midgley et al. | |

(Continued)

OTHER PUBLICATIONS

Tieleman, Sjoerd, "Formalisation of Version Control with an Emphasis on Tee-Structured Data", Aug. 5, 2006, 61 pages.
Auer et al., "A Versioning and Evolution Framework for RDF Knowledge Bases", PSI'06 Proceedings of the 6th International Andrei Ershov Memorial Conference on Perspectives of Systems Informatics, 2006, pp. 55-69.

(Continued)

*Primary Examiner* — Cam-Y Truong
(74) *Attorney, Agent, or Firm* — Henry Gabryjelski; Micky Minhas

(57) ABSTRACT

Systems and methods are described herein for creating, maintaining and applying a dataset that can be used to synchronize multiple instances of a data store. The dataset includes a sequentially-ordered sequence of change sets associated with the data store, wherein each change set includes zero or more entries that specify how the state of certain entities in the data store have changed since state changes represented by a previous change set in the sequence were applied to the data store. When a new change set is added to the dataset, any entries in any previously-added change sets dealing with the entities identified in the new change set are removed. Consequently, the dataset provides a concise and complete representation of all the state changes that have occurred to the data store since a known origin state.

18 Claims, 5 Drawing Sheets

(56) References Cited

U.S. PATENT DOCUMENTS

| | | | |
|---|---|---|---|
| 2005/0246389 A1* | 11/2005 | Shah et al. .................... | 707/200 |
| 2006/0259525 A1* | 11/2006 | Bae ..................... | G06F 11/1658 |
| 2007/0255763 A1* | 11/2007 | Beyerle ............ | G06F 17/30581 |
| 2008/0140732 A1 | 6/2008 | Wilson et al. | |
| 2008/0228697 A1 | 9/2008 | Adya et al. | |
| 2009/0144343 A1* | 6/2009 | Holt et al. .................... | 707/203 |
| 2010/0174690 A1* | 7/2010 | Marcotte ...................... | 707/695 |
| 2010/0235335 A1 | 9/2010 | Heman et al. | |

OTHER PUBLICATIONS

Brown et al., "Large Scale Data Warehousing with the SAS® System", Paper 114, Online Available at <http://citeseerx.ist.psu.edu/viewdoc/download?doi=10.1.1.136.18118&rep=rep1&type=pdf>, Retrieved on Jul. 13, 2011, 10 pages.

* cited by examiner

APPLICATION OF A DIFFERENTIAL DATASET TO A DATA STORE USING SEQUENTIAL CHANGE SETS

CROSS-REFERENCE TO RELATED APPLICATIONS

This application is a continuation of U.S. patent application Ser. No. 13/275,957, filed Oct. 18, 2011, the entirety of which is incorporated by reference herein.

BACKGROUND

In certain computing environments, a first machine may make changes to a first instance of a data store utilized by the machine and then a second instance of the data store will be brought into synchronization with the first instance of the data store. For example, the second instance of the data store may comprise a backup copy of the data store that is kept in synchronization with the first instance of the data store so that it can be accessed as part of a recovery operation in case the first instance of the data store is lost. As another example, the data store may comprise user settings that a user wishes to apply to different instances of the same program running on different virtual and/or physical machines, such that a change to the user settings associated with one instance of the program running on one virtual and/or physical machine will be propagated to the user settings associated with other instances of the program running on other virtual and/or physical machines.

Synchronizing multiple instances of a data store typically requires choosing between using a "full dataset" approach and a "differential dataset" approach to perform the data store updates. As used in this context, the term "full dataset" refers to a dataset that provides a complete snapshot of the current state of each and every entity stored in a data store. While the full dataset approach has the benefit of being able to quickly update a new instance of a data store because all required state information is present in the dataset, the full dataset approach can be very inefficient when performing incremental updates in which only a few entities in an instance of a data store need to be modified. This is because, for incremental updates, the state of each entity in the instance of the data store must be compared to the state of each entity recorded in the snapshot to determine which entities actually require updating. As a result, systems that utilize the full dataset approach to perform frequent data store updates may suffer from performance problems.

As also used in this context, the term "differential dataset" refers to a dataset that includes only those state changes that have occurred since a previous differential dataset was generated for a data store. Using the differential dataset approach to update an instance of a data store involves applying in a defined order only those differential datasets that have been generated since the instance of the data store was last revised. Thus, the differential dataset approach can achieve more efficient updating of an instance of a data store than the full dataset approach. However, the differential dataset approach requires more complexity and overhead than the full dataset approach because it requires the management and ordered application of multiple differential datasets. For example, updating a new instance of a data store using the differential dataset approach requires applying all the differential datasets that have been created for the data store in the exact order in which such differential datasets were created to ensure synchronization.

Certain implementations that use either the full dataset approach or differential dataset approach as discussed above have required the use of a central server to host a version control system or database to manage the versioning of the data. Networked servers, Web services, cloud-based services and other centralized services have also been used.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Systems and methods are described herein for creating, maintaining and applying a dataset that can be used to synchronize multiple instances of a data store. The dataset includes a sequentially-ordered sequence of change sets associated with the data store, wherein each change set includes zero or more entries that specify how the state of certain entities in the data store have changed since state changes represented by the previous change set in the sequence were applied to the data store. When a new change set is added to the dataset, any entries in any previously-added change sets dealing with the entities identified in the new change set are removed. Consequently, the dataset provides a concise and complete representation of all the state changes that have occurred to the data store since a known origin state. In particular, the dataset represents only the most-recent changes that have occurred to each member of the dataset. If an entity in the dataset has been change five times, only the most-recent modification of the entity is recorded.

By using a dataset including sequentially-ordered change sets to synchronize multiple instances of a data store as described herein, benefits associated with both the "full dataset" and "differential dataset" approaches discussed in the Background Section above can be achieved. For example, because such a dataset provides a concise and complete representation of all the state changes that have occurred to the data store since a known origin state, the dataset can be used to quickly update a brand new instance of a data store. Multiple differential datasets do not have to be managed or applied to achieve this. Additionally, since such a dataset provides a complete representation of the current state of the data store, multiple versions of the dataset can be stored by any version control system and selectively accessed and applied to rollback an instance of a data store to a desired change state.

Furthermore, since such a dataset includes sequentially-ordered change sets, it can be used to efficiently update a data store that only needs a small number of incremental changes applied (e.g., only the changes represented by the last change set in the sequence). This can improve processing efficiency both in terms of the speed and scope of the transaction. Such a dataset may also create a smaller memory footprint as compared to the full dataset approach since the dataset is concise and stores the most recent state of only those entities that have undergone a state change since a known origin state.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
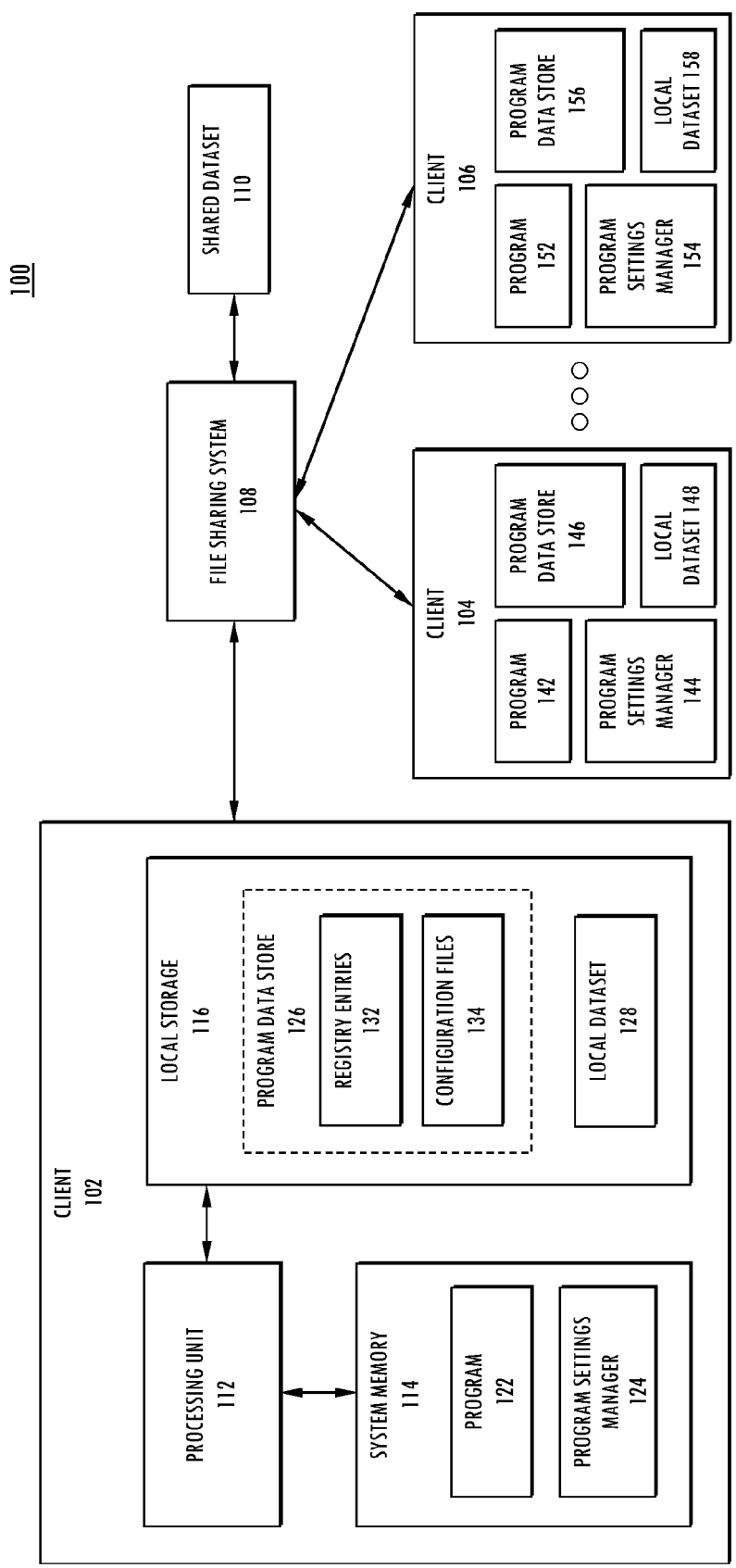
FIG. 1 is a block diagram of a system in accordance with an embodiment that may implement various methods for creating, maintaining and applying a dataset that can be used to synchronize multiple instances of a data store.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example System Implementation

FIG. 1 is a block diagram of an example system 100 that may implement various methods described herein for creating, maintaining and applying a dataset that can be used to synchronize multiple instances of a data store. System 100 of FIG. 1 is presented by way of example only and is not intended to be limiting. Based on the teachings provided herein, persons skilled in the relevant art(s) will appreciate that systems other than system 100 may also implement the inventive methods. For example, various alternative implementations will be described below in Section IV.

As shown in FIG. 1, system 100 includes a plurality of clients, denoted client 102, client 104 and client 106, each of which is communicatively connected to a file sharing system 108. Although three clients are shown in FIG. 1, it is to be understood that any number of clients may be included. Each client is intended to represent a machine that is capable of executing an instance of the same program. Thus, for example, client 102 is capable of executing a program 122, client 104 is capable of executing a program 142 and client 106 is capable of executing a program 152, wherein program 122, program 142 and program 152 are intended to represent different instances of the same program. The program may comprise an application (including but not limited to a Web browser, a word processor, a spreadsheet application, an e-mail application, a programming application, a video game application, or the like), an operating system or operating system component, or any other software program, module or entity.

FIG. 1 shows client 102 in more detail. As shown in FIG. 1, client 102 includes a processing unit 112 that is communicatively connected to a system memory 114 and to local storage 116. Processing unit 112 may comprise one or more processors or processing cores. Processing unit 112 is configured to operate in a well-known manner to execute instructions that are loaded into system memory 114. For example, processing unit 112 is configured to execute instructions associated with program 122, a program settings manager 124, and other computer programs that are loaded into system memory. Such instructions may be loaded into system memory 114 from local storage 116 or from some other source. In accordance with certain implementations, system memory 114 may comprise some type of volatile memory, such as random access memory (RAM), although this is only an example and other types of memories may be used to implement system memory 114.

Processing unit 112 is also configured to read data from and write data to local storage 116 in a well-known manner Local storage 116 may comprise by way of example only and without limitation, a hard disk, a CD-ROM, digital versatile disk (DVD) or other optical disk storage, a magnetic cassette, magnetic tape, magnetic disk storage or other magnetic storage devices, or any other medium which can be used to store desired information and which can accessed by a processing unit such as processing unit 112.

Program 122 has associated therewith a program data store 126 that includes data representative of various user settings associated with program 122. Such user settings may comprise any of a wide variety of user settings that may be made available by or are otherwise associated with a computer program. In the embodiment shown in FIG. 1, the data representative of such user settings is stored as registry entries 132 and in one or more configuration files 134 within local storage 116. While program 122 is executing, a user thereof may interact with a suitable program interface to modify any of the user settings made available by or otherwise associated with program 122, thereby causing modifications to occur to registry entries 132 and/or configuration files 134. It is noted that still other methods may be used to modify the user settings and that data representative of such user settings may be stored in locations other than a registry or a configuration file.

As previously noted, program 122, program 142 and program 152 are instances of the same program that are executed by different client machines. In order to ensure that a user of the program has a similar user experience across all such client machines, it may be deemed desirable to propagate user settings changes made while interacting with one instance of the program to all instances of the program. This may be achieved, for example, by propagating changes made to program data store 126 associated with program 122 to a program data store 146 associated with program 142 and to a program data store 156 associated with program 152. Additionally, changes made to program data stores 146 and 156 may be propagated between those data stores as well as back to program data store 126.

To achieve such synchronization between each of program data stores 126, 146 and 156, a program settings manager is installed on each of clients 102, 104 and 106. In particular, a program settings manager 124 is installed on client 102, a program settings manager 144 is installed on client 104 and a program settings manager 154 is installed on client 106. The functions of the program settings manager will now be described in reference to program settings manager 124 which is executed by processing unit 112 on client 102. However, it is to be understood that similar functions are performed by program settings manager 144 on client 104 and program settings manager 154 on client 106.

Program settings manager 124 executes concurrently with program 122 (although both may be launched at different times) and operates to monitor the execution of program 122 to determine when program 122 is opened and closed by a user and to determine when a user has caused user settings associated with program 122 to be changed.

When program settings manager 124 detects that program 122 is being opened, it determines if the user settings stored in program data store 126 are synchronized with an authoritative version of the program data store. In one embodiment, program settings manager 124 performs this function by determining whether a shared dataset 110 made available by file sharing system 108 was updated more recently than a local dataset 128 stored by program settings manager 124 in local storage 116. Program settings manager 124 may perform this function, for example, by comparing a timestamp associated with shared dataset 110 to a timestamp associated with local dataset 128. If program settings manager 124 determines that shared dataset 110 was updated more recently than local dataset 110, then it downloads shared dataset 110, applies one or more new change sets included therein to program data store 126, and then overwrites local dataset 128 with shared dataset 110 or updates local dataset 128 based on shard dataset 110. The manner by which program settings manager 124 applies the new change sets to program data store 126 will be described in more detail below.

Although the foregoing operations of program settings manager 124 are described as being performed when program settings manager 124 detects that program 122 is being opened, it is noted that in alternate embodiments program settings manager 124 may perform such operations at other times or when other events are detected where it would be appropriate to compare and possibly apply any updated user settings. For example and without limitation, program settings manager 124 may perform such operations when a user logs onto a system, when a screen is unlocked, when a timeout expires, or the like.

When program settings manager 124 detects that program 122 is being closed, program settings manager 124 determines whether any of the user settings stored in program data store 126 have been changed. Program settings manager 124 may perform this function, for example, by logging any changes made to registry entries 132 and configuration files 134 during the program session and then inspecting the log when program 122 is closed, although this is only an example. If program settings manager 124 determines that no user settings have been changed then it takes no action. However, if program settings manager 124 determines that one or more user settings have been changed, then program settings manager 124 will add a new change set to local dataset 128 and then provide the updated copy of local dataset 128 to file sharing system 108. The manner in which program settings manager 124 adds a new change set to local dataset 128 will be described in more detail below.

Although the foregoing operations of program settings manager 124 are described as being performed when program settings manager 124 detects that program 122 is being closed, it is noted that in alternate embodiments program settings manager 124 may perform such operations at other times or when other events are detected where it would be appropriate to determine if user settings have changed and to synchronize any changes to a shared dataset. For example and without limitation, program settings manager 124 may perform such operations when a user logs off a system, when a screen is locked, when a machine is powered down, when a timeout expires, or the like.

Program settings manager 144 executed by client 104 and program settings manager 154 executed by client 106 each operate in a like manner to program settings manager 124 as described above. Thus, each of client 104 and client 106 is capable of downloading a copy of shared dataset 110 from file sharing system 108 to synchronize its program data store with an authoritative version of the data store and of providing updated copies of a local dataset to file sharing system 108. In the case of client 104, the local dataset is local dataset 148 and in the case of client 106, the local dataset is local dataset 158.

File sharing system 108 is intended to represent any system capable of managing shared dataset 110, which represents the authoritative state of the program data store, and providing clients 102, 104 and 106 with access thereto. Since file sharing system 108 can receive updated datasets from each of clients 102, 104 and 106, it must determine which updated dataset received from a client reflects the authoritative state of the program data store. In one embodiment, file sharing system 108 performs this function by implementing a "last writer wins" approach in which the dataset that was most recently updated is deemed to reflect the authoritative state of the program data store. In other words, file sharing system 108 will operate to ensure that shared dataset 110 is consistent with the most recently updated dataset received from any of clients 102, 104 and 106. Of course, other methods may be applied to determine which dataset should be deemed to represent the authoritative state of the program data store. Furthermore, the file sharing system need not be the entity that operates to determine when a collision occurs. For example, this can also be detected by each client.

III. Example Methods for Dataset Maintenance and Application

Exemplary methods for maintaining a dataset that can be used to synchronize multiple instances of a data store and for applying a dataset to synchronize an instance of a data store will now be described. These exemplary methods are provided herein by way of example only and are not intended to be limiting. Furthermore, although these exemplary methods will be described with continued reference to system 100 of FIG. 1, the methods are not limited to that embodiment.

Figure 2:
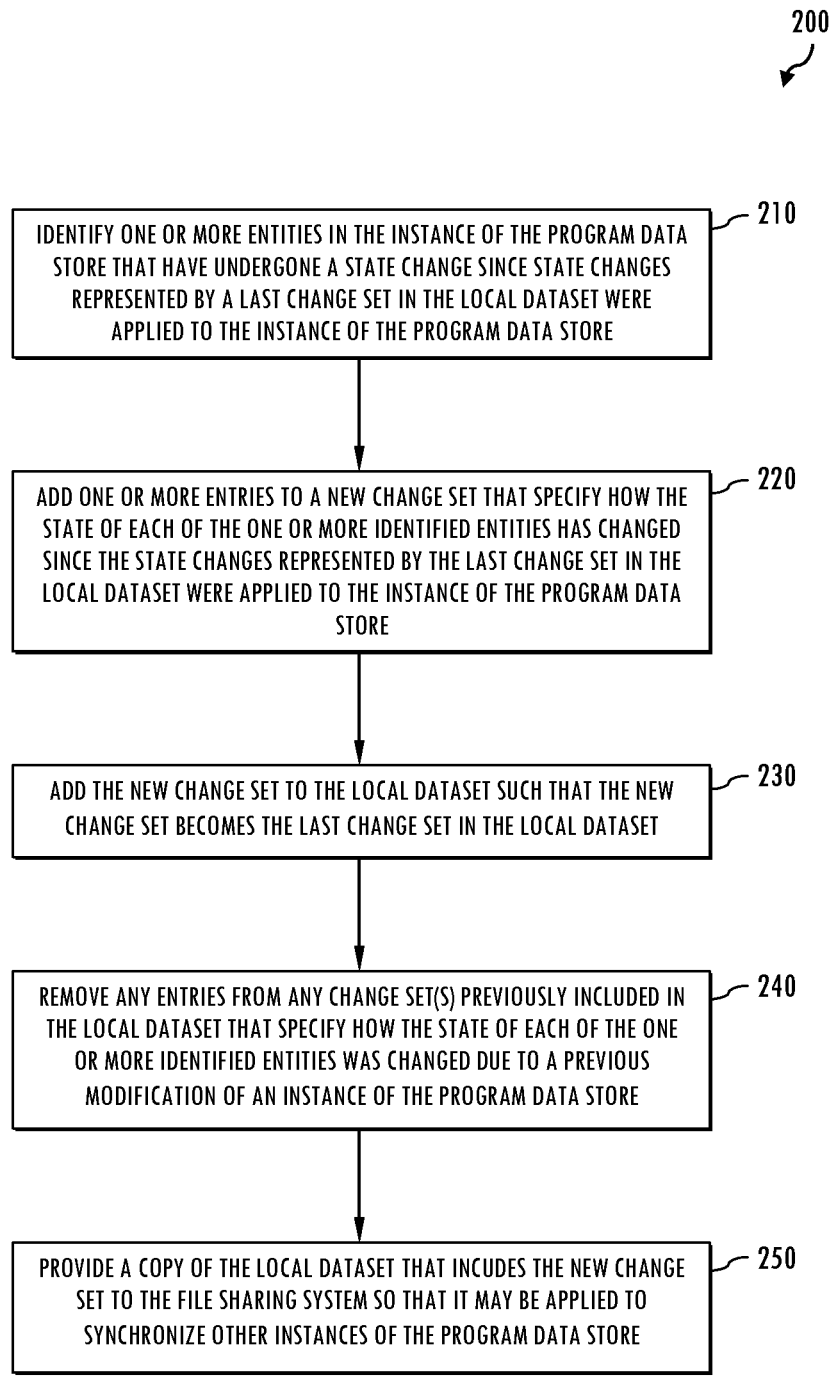
FIG. 2 depicts a flowchart of a method for maintaining a dataset that can be used to synchronize multiple instances of a data store in accordance with an embodiment.

In particular, FIG. 2 depicts a flowchart 200 of a method for maintaining a dataset that can be used to synchronize multiple instances of a data store in accordance with an embodiment. The method of flowchart 200 may be performed, for example, by any of program settings managers 124, 144 or 154 as described above in reference to system 100 of FIG. 1. For the purposes of illustration only, the steps of the method will now be described as if they were being performing by program settings manager 124. Program settings manager 124 may perform the steps of flowchart 200, for example, when it determines that a user is closing program 122 or when it determines that some other event has occurred.

As shown in FIG. 2, the method of flowchart 200 begins at step 210, in which program settings manager 124 identifies one or more entities in program data store 126 that have undergone a state change since state changes represented by a last change set in local dataset 128 were applied to program data store 126. In one embodiment, program settings manager 124 may perform this function by logging any changes made to registry entries 132 and configuration files 134 during a program session and then inspecting the log when program 122 is closed, although this is only an example. If program settings manager 124 does not identify any entities that have undergone a state change since state changes represented by the last change set in local dataset 128 were applied to program data store 126, then the process ends.

However, if program settings manager 124 does identify one or more entities that have undergone a state change since state changes represented by the last change set in local dataset 128 were applied to program data store 126, control flows to step 220. During step 220, program settings manager 124 adds one or more entries to a new change set that specify how the state of each of the one or more identified entities has changed since the state changes represented by the last change set in the local dataset were applied to program data store 126.

At step 230, program settings manager 124 adds the new change set created during step 220 to local dataset 128 such that the new change set becomes the last change set in a sequentially-ordered list of change sets in local dataset 128. It should be noted that, in certain embodiments, steps 220 and 230 may be performed simultaneously by creating a new change set at the end of the sequentially-ordered list of change sets in local dataset 128 and writing the entries created during step 220 directly into the new change set.

At step 240, program settings manager 124 removes any entries from any change set(s) previously included in local dataset 128 that specify how the state of each of the one or more identified entities was changed due to a previous modification of an instance of the program data store. As will be discussed below, such entries may be removed since they are not necessary to reflect the current state of program data store 126. This results in a concise representation of the current state of program data store 126. Note that the application of step 240 may result in one or more previously-included change sets having no entries associated therewith.

At step 250, program settings manager 124 provides a copy of local dataset 128 that includes the new change set to file sharing system 108 so that it may be applied to synchronize other instances of the program data store, such as program data store 146 and program data store 156. As discussed above, in one embodiment, file sharing system 108 will treat the copy of local dataset 128 as an authoritative representation of the state of the program data store if it was updated more recently than shared dataset 110. In this case, file sharing system may use the copy of local dataset 128 provided during step 250 as the new shared dataset 110.

A particular example of the application of the method of flowchart 200 will now be described with reference to block diagram 300 of FIG. 3. The example of block diagram 300 is provided herein for illustrative purposes only and is not intended to be limiting.

Figure 3:
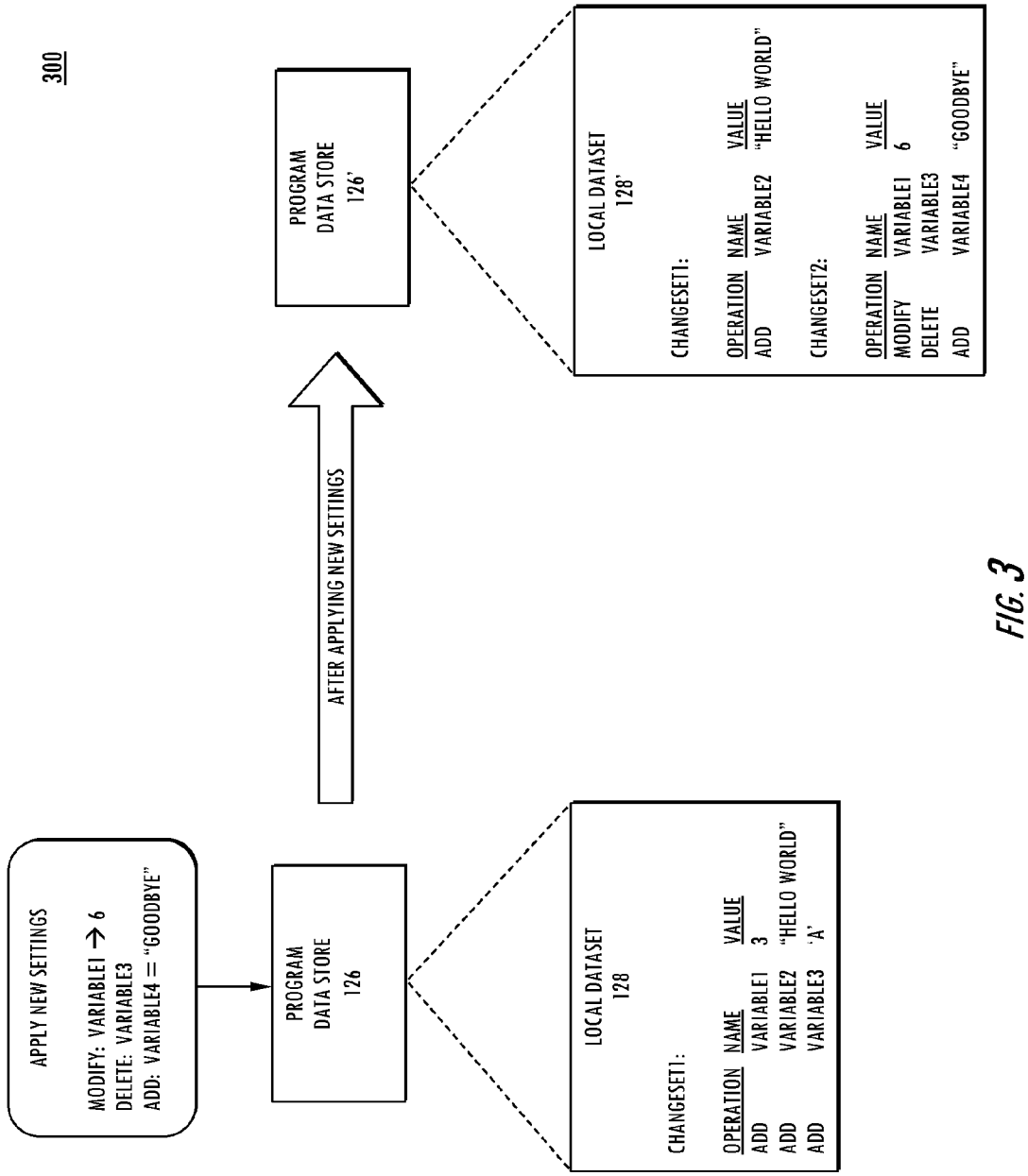
FIG. 3 is a block diagram that illustrates the manner in which a dataset may be updated in response to the application of changes to an instance of a data store in accordance with an embodiment.

As shown in FIG. 3, prior to the application of any new settings, the state of program data store 126 is represented by local dataset 128. In particular, local dataset 128 represents the current state of program data store 126 relative to a known origin state as a series of operations associated with a previously-recorded first change set, denoted "changeset1." These operations included adding an entity named "variable1" having a value of 3, adding an entity named "variable2" having a value of "hello world" and adding an entity named "variable3" having a value of 'a.'

As further shown in FIG. 3, a user interacts with program 122 to change various user settings associated therewith. As a result of these changes, the state of program data store 126 is modified, producing an updated program data store 126.' In accordance with the changes, the value of the entity named "variable1" is modified from 3 to 6, the entity named "variable3" is deleted, and a new entity named "variable4" having a value of "goodbye" is added. In response to detecting the user setting changes, program settings manager 124 performs the steps of flowchart 200. As noted above, program settings manager 124 may perform these steps when it determines both that the user is closing program 122 and that user settings were changed during the program session.

In particular, in accordance with step 210, program settings manager 124 identifies that the entities named "variable1," "variable3" and "variable4" have undergone a state change since the state changes represented by the change set named "changeset1" were applied to program data store 126.

In accordance with step 220, program settings manager 124 adds entries to a new change set named "changeset2" that specify how the state of the entities named "variable1," "variable3" and "variable4" have changed. In particular, program settings manager 124 adds the following operations to the change set named "changeset2": an operation that modifies the entity named "variable1" to have a value of 6, an operation that deletes the entity named "variable3," and an operation that adds an entity named "variable4" having a value of "goodbye."

In accordance with step 230, program settings manager 124 adds the change set named "changeset2" as the last change set in the sequentially ordered list of change sets in an updated version of local dataset 128.' As noted above, program settings manager 124 may perform steps 220 and 230 simultaneously by creating new change set "changeset2" at the end of the sequentially-ordered list of change sets in local dataset 128' and writing the entries created during step 220 directly into the new change set.

In accordance with step 240, program settings manager 124 removes any entries from any change sets previously included in local dataset 128 that specify how the state of each of the entities named "variable1", "variable3" and "variable4" was changed due to a previous modification of program data store 126, since such entries are not necessary to reflect the current state of those entities. In accordance with the example of FIG. 3, this means that program settings manager 124 will remove the following operations from the change set named "changeset1": the operation that adds the entity named "variable1" having a value 3 and the operation that adds the entity named "variable3" having a value 'a.'

In accordance with step 250, program settings manager 124 provides a copy of local dataset 128' that includes the modified change set named "changeset1" and the new change set named "changeset2" to file sharing system 108 so that it may be applied to synchronize other instances of the program data store, such as program data store 146 and program data store 156. As discussed above, in one embodiment, file sharing system 108 will treat the copy of local dataset 128' as an authoritative representation of the state of the program data store if it was written or updated more recently than shared dataset 110. In this case, file sharing system 108 may use the copy of local dataset 128' provided during step 250 as the new shared dataset 110.

In accordance with the example shown in FIG. 3, each dataset is represented by a single file that includes a sequentially-ordered sequence of change sets. In further accordance with this example, adding a new change set to the file includes adding entries under a new change set marker or label that is inserted at the end of the sequentially-ordered list. This enables any program settings manager to determine where one change set ends and a new change set begins and the order in which such change sets should be applied. However, it is noted that a dataset need not comprise a file. For example, in certain implementations, a dataset may comprise a database that stores various change sets associated with an program data store and that maintains some notion of an ordering of such change sets.

In further accordance with the example shown in FIG. 3, a predefined set of operations are used to specify how the state of an entity in an program data store has changed. In particular, such state changes are represented using "add," "modify" and "delete" operations. However, it is noted that other operations or representations may be used to convey how the state of an entity has changed depending upon the implementation.

Figure 4:
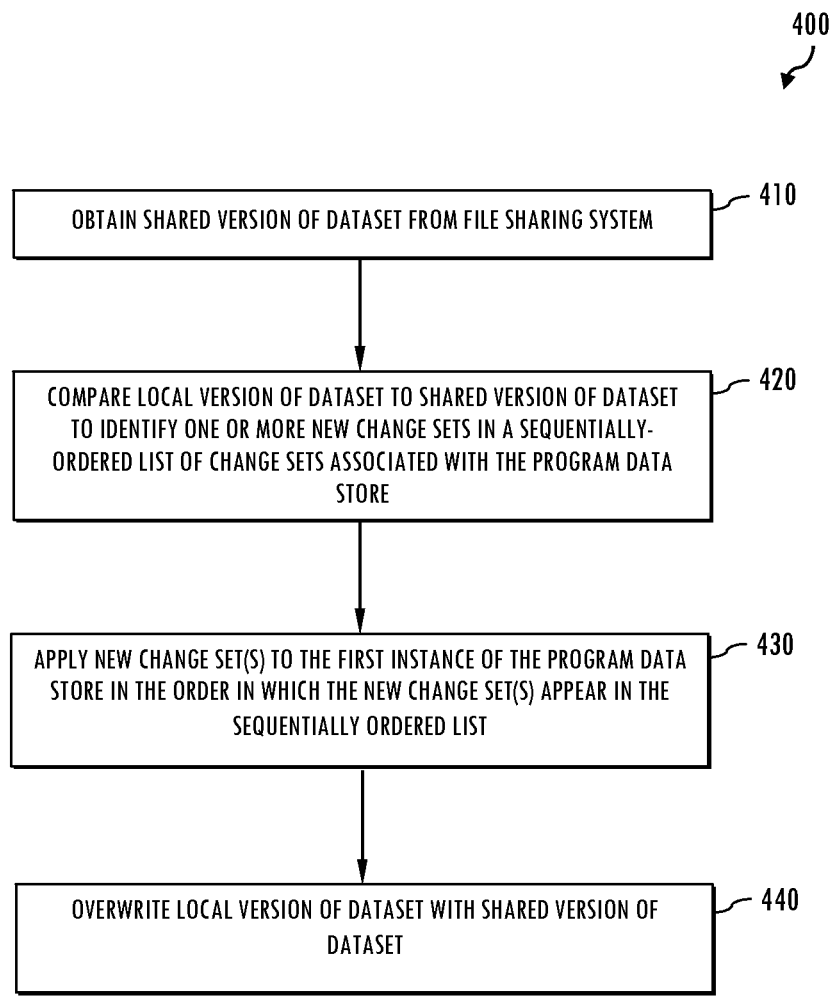
FIG. 4 depicts a flowchart of a method for applying a dataset to synchronize a first instance of a data store with at least one other instance of the data store in accordance with an embodiment.

FIG. 4 depicts a flowchart of a method 400 for applying a dataset to synchronize a first instance of a data store with at least one other instance of the data store in accordance with an embodiment. Like the method of flowchart 200, the method of flowchart 400 may be performed by any of program settings managers 124, 144 or 154 as described above in reference to system 100 of FIG. 1. For the purposes of illustration only, the steps of the method will now be described as if they were being performing by program settings manager 124. Program settings manager 124 may perform the steps of flowchart 400, for example, when it determines that a user is opening program 122 or when it determines that some other event has occurred.

As shown in FIG. 4, the method of flowchart 400 begins at step 410 in which program settings manager 124 obtains a copy of shared dataset 110 from file sharing system 108. As discussed above, program settings manager 124 may perform this step in response to determining that a user is opening program 122 and that shared dataset 110 was more recently updated than local dataset 128.

At step 420, program settings manager compares local dataset 128 to shared dataset 128 to identify one or more new change sets in a sequentially-ordered list of change sets associated with the program data store. For example, such new change sets may be present in shared dataset 110 but not in local dataset 128.

Figure 5:
FIG. 5 depicts a step that is performed in applying a new change set to a data store in accordance with an embodiment.

At step 430, program settings manager 124 applies any new change set(s) identified during step 420 to program data store 126 in the order in which the new change set(s) appear in the sequentially-ordered list. FIG. 5 illustrates a step 500 that may be performed in applying a new change set to program data store 126. As shown in FIG. 5, step 500 includes performing one or more operations included in the new change set with respect to one or more corresponding entities in program data store 126. Each such operation may represent how the state of a corresponding entity was changed due to a modification of an instance of the program data store other than the instance represented by program data store 126 (e.g., program data store 146 or program data store 156). In one embodiment, all the operations associated with a new change set are implemented as a single atomic transaction to ensure that program data store 126 will end up in a fully synchronized state if all operations are carried out successfully or remain in its pre-existing state should any of the operations fail.

At step 440, after the new change set(s) identified during step 420 have been applied to program data store 126, program settings manager 124 overwrites local dataset 128 with shared dataset 110. Equivalently, program settings manager 124 may modify the contents of local dataset 128 so that such contents are consistent with the contents of shared dataset 110 (e.g., program settings manager 124 may add the new change set(s) identified during step 420 to local dataset 128).

As a result of performing the steps of flowchart 400, program data store 126 can be brought into synchronization with another instance of program data store (e.g., program data store 146 or program data store 156), the state of which is represented by shared dataset 110.

A particular example of the application of the method of flowchart 400 will now be described for illustrative purposes. In accordance with this example, it is to be assumed that shared dataset 110 includes the change sets shown in local dataset 128' in FIG. 3 (i.e., the change sets named "changeset1" and "changeset2"). It is to be further assumed that the state of program data store 126 is represented by local dataset 128 and that local dataset 128 includes the change sets shown in local dataset 128 shown in FIG. 3 (i.e., the change set named "changeset1" only).

In accordance with this example, at step 410 of flowchart 400, program settings manager 124 would obtain a copy of shared dataset 110 from file sharing system 108 and, at step 420, program settings manager 124 would compare local dataset 128 to shared dataset 110 to identify the change set named "changeset2" as a new change set. In accordance with step 430, program settings manager 124 would apply the change set named "changeset2" to program data store 126 by performing the operations included in the change set. In particular, program settings manager 124 would modify the value of the entity named "variable1" from 3 to 6, delete the entity named "variable3," and add a new entity named "variable4" having a value of "goodbye." It is noted that if shared dataset 110 included further new change sets, program settings manager 124 would apply such new change sets to program data store 126 in the order in which such new change set(s) appear in the sequentially-ordered list in shared dataset 110. Program settings manager 124 would not apply the change set named "changeset1" since that change set is already present in local dataset 128 and thus was already applied. Finally, in accordance with step 440, program settings manager 124 would overwrite local dataset 128 with shared dataset 110 or, equivalently, modify the contents of local dataset 128 so that such contents are consistent with the contents of shared dataset 110.

By using a dataset including sequentially-ordered change sets to synchronize multiple instances of a data store as described above, system 100 can achieve benefits associated with both the "full dataset" and "differential dataset" approaches discussed in the Background Section above. For example, because such a dataset provides a concise and complete representation of all the state changes that have occurred to the program data store since a known origin state, the dataset can be used to quickly update a brand new instance of an program data store. Multiple differential datasets do not have to be managed or applied to achieve this. Furthermore, since such a dataset includes sequentially-ordered change sets, it can be used to efficiently update an program data store that only needs a small number of incremental changes applied (e.g., only the changes represented by the last change set in the sequence). This can improve processing efficiency both in terms of the speed and scope of the transaction. Such a dataset also creates a relatively small memory footprint as compared to the full dataset approach since the dataset is concise and only stores the most recent entity states.

IV. Alternate Implementations

Although the description of system 100 provided herein refers to the synchronization of data stores associated with instances of the same program, it is noted that a similar approach can be used to synchronize data stores associated with instance of different programs. For example, the "homepage" setting for a first type of Internet browser (e.g., Windows® Internet Explorer®) implemented on a first machine could be referenced to determine the "homepage" setting for a second type of Internet browser (e.g., Mozilla® Firefox®) implemented on a second machine. As another example, the "wallpaper" setting for a first type of operating system (e.g., Windows® 7) implemented on a first machine could be referenced to determine the "wallpapers" setting for a second type of operating system (e.g., Mac OS® X) implemented on a second machine.

Furthermore, although FIG. 1 shows program 122, program 142 and program 152 executing on different client machines, such programs could also be executed on the same machine. For example, multiple instances of a word processing application could be executed on the same machine. In this case, the same principles described herein could be applied to synchronize data stores associated with each program instance.

As noted above, the various methods described herein for creating, maintaining and applying a dataset used to synchronized multiple instances of a data store may be performed in other systems or environments than that described above in reference to FIG. 1. To help illustrate this, some alternative implementations will be described in this section.

For example, rather than utilizing a file sharing system such as file sharing system 108 to manage a single shared dataset 110, an embodiment may utilize a server or other machine to host a version control system that maintains distinct versions of shared dataset 110 and makes such versions available to clients. Networked servers, Web services, cloud-based services and other centralized services may also be used. Thus, with continued reference to the example of FIG. 3, the version control system may maintain a first version of shared dataset 110 that includes only the change set named "changeset1," a second version of shared dataset 110 that include the change set named "changeset1" and the change set named "changeset2," a third version of shared dataset 110 that includes the change set named "changeset1," the change set named "changeset2," and a new change set named "changeset3," and so on. In this way, a client could selectively access a desired version of shared dataset 110 to roll back the user settings associated with a program to a desired change state. The roll back would involve restoring the user settings to their original known state and then applying the selected shared dataset thereto.

As also noted above, although there are benefits associated with storing all the sequentially-ordered change sets of a dataset in a single file, in an alternative embodiment, the change sets could be stored in a database that maintains some notion of an ordering of such change sets and a database server could be used to access such change sets when required. Furthermore, datasets and/or change sets could be exposed and made accessible via some other custom implementation such as a custom server or a set of Web services that facilitates clients using this technology.

In certain embodiments, components shown as being executed by or stored on a client in system 100 could actually be executed by or stored on a remote component that is communicatively connected to a client via a wired or wireless connection, such as a wired or wireless network connection. For example, instead of executing on client 102, program 122 and program setting manager 124 may be executed on a remote machine and client 102 may provide an interface to such remote machine (e.g., such programs may comprise Web applications that a user accesses via a browser executing on client 102). As another example, program data store 126 and local dataset 128 which are shown in FIG. 1 as being stored in local storage 116 of client 102 may be stored on a remote system or device. Such implementations could be achieved without altering the fundamental principles of the inventive methods for synchronizing multiple instances of a data store as described herein.

In accordance with further embodiments, the different program data store instances shown in FIG. 1 may be associated with different virtual machines instead of different physical machines.

Furthermore, the foregoing methods may be utilized to synchronize any of a variety of different data store types other than program data stores. For example, in one embodiment the foregoing methods may be used to synchronize local user profile data stores that are stored on multiple computers. In another embodiment, the foregoing methods may be used to synchronize a backup copy of a data store used by a machine, such that the backup copy can be used in a case where the original copy is corrupted or lost. Still other applications of the foregoing methods are contemplated.

V. Example Computer System Implementations

Figure 6:
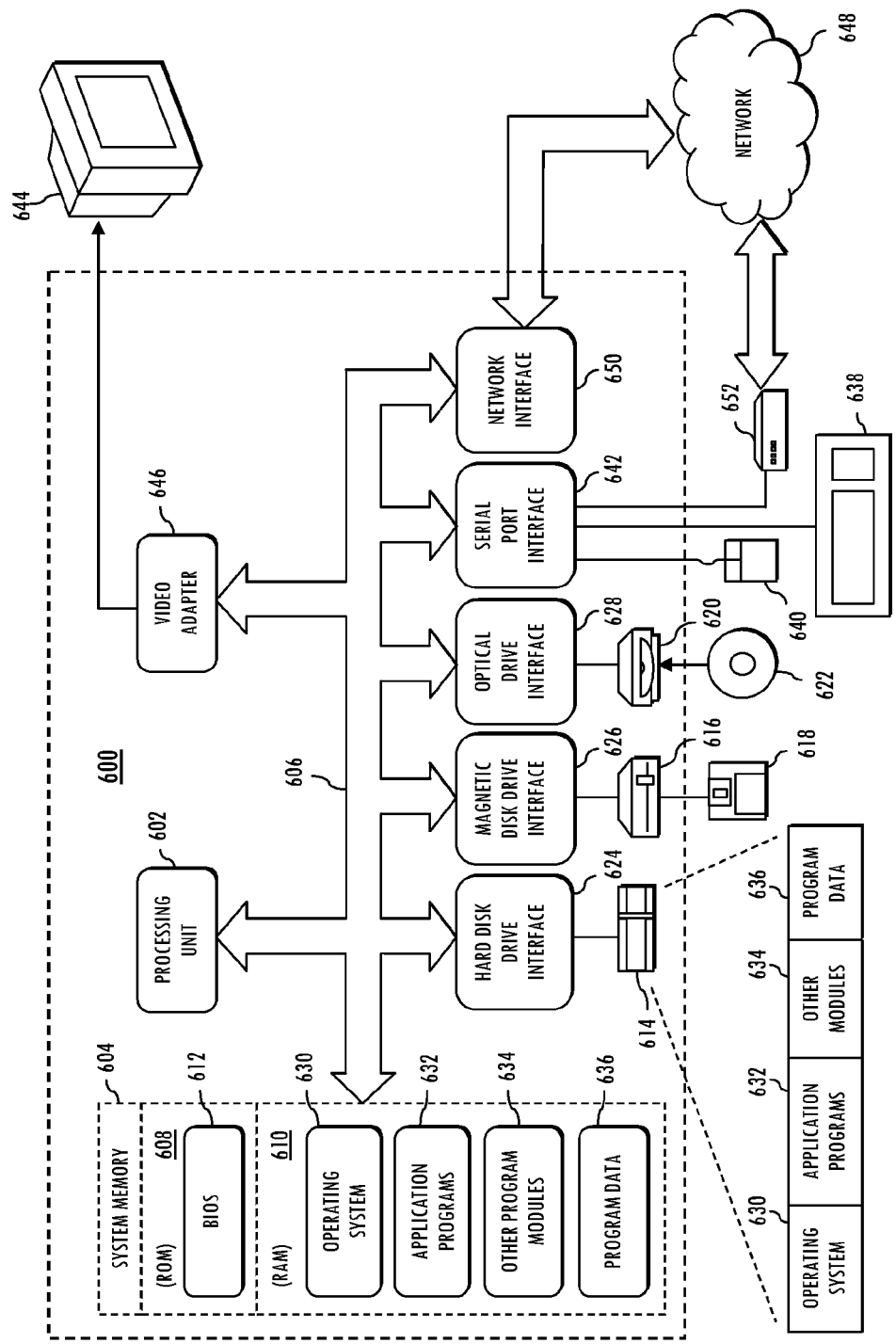
FIG. 6 is a block diagram of an example computer system that may be used to implement various embodiments described herein.

FIG. 6 depicts an example computer system 600 that may be used to implement various embodiments described herein. For example, computer system 600 may be used to implement any of client 102, client 104, client 106, and file sharing system 108 of FIG. 1, as well as any sub-components thereof. The description of computer system 600 provided herein is provided for purposes of illustration, and is not intended to be limiting. Embodiments may be implemented in further types of computer systems, as would be known to persons skilled in the relevant art(s).

As shown in FIG. 6, computer system 600 includes a processing unit 602, a system memory 604, and a bus 606 that couples various system components including system memory 604 to processing unit 602. Processing unit 602 may comprise one or more processors or processing cores. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer system 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, BLU-RAY™ disk or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 630, one or more application programs 632, other program modules 634, and program data 636. In accordance with various embodiments, the program modules may include computer program logic that is executable by processing unit 602 to perform any or all of the functions and features of client 102, client 104, client 106, and file sharing system 108 of FIG. 1, as well as any sub-components thereof, as well as any sub-components thereof, as described elsewhere herein. The program modules may also include computer program logic that, when executed by processing unit 602, performs any of the steps or operations shown or described in reference to FIGS. 2, 4 and 5. In one embodiment, application programs 632 and/or other program modules 634 include one of programs 122, 142 and 152 and a corresponding one program settings manager 124, 144 and 154.

A user may enter commands and information into computer system 600 through input devices such as a keyboard 638 and a pointing device 640. Other input devices (not shown) may include a microphone, joystick, game controller, scanner, or the like. In one embodiment, a touch screen is provided in conjunction with a display 644 to allow a user to provide user input via the application of a touch (as by a finger or stylus for example) to one or more points on the touch screen. These and other input devices are often connected to processing unit 602 through a serial port interface 642 that is coupled to bus 606, but may be connected by other interfaces, such as a parallel port, game port, or a universal serial bus (USB).

A display 644 is also connected to bus 606 via an interface, such as a video adapter 646. In addition to display 644, computer system 600 may include other peripheral output devices (not shown) such as microphones, speakers and printers.

Computer system 600 is connected to a network 648 (e.g., a local area network or wide area network such as the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable medium" are used to generally refer to non-transitory media such as ROM 608 and RAM 610 used to implement system memory 604, the hard disk associated with hard disk drive 614, removable magnetic disk 618, removable optical disk 622, as well as other media such as flash memory cards, digital video disks, and the like.

As noted above, computer programs and modules (including application programs 632 and other program modules 634) may be stored on ROM 608, RAM 610, the hard disk, magnetic disk 618, or optical disk 622. Such computer programs may also be received via network interface 650 or serial port interface 642. Such computer programs, when executed by processing unit 602, enable computer system 600 to implement features of embodiments discussed herein. Accordingly, such computer programs represent controllers of computer system 600.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, any of client 102, client 104, client 106, and file sharing system 108 of FIG. 1, as well as any sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method for synchronizing a local instance of a data store with at least one remote instance of the data store, comprising:
   comparing a local version of a dataset, that includes a first sequentially-ordered list of change sets associated with the local instance of the data store, to a shared version of the dataset, that includes a second sequentially-ordered list of change sets associated with the at least one remote instance of the data store, to identify one or more new change sets that are included in the shared version of the dataset and are not included in the local version of the dataset, the one or more new change sets comprising a set of operations that represent how a state of a corresponding set of entities in the local instance of the data store must be changed to bring the local instance of the data store into synchronization with the at least one remote instance of the data store, and the one or more new change sets having been automatically modified to ensure that only a single operation is included in the set of operations for each entity in the corresponding set of entities; and
   applying the one or more new change sets to the local instance of the data store in the order in which the one or more new change sets appear in the second sequentially-ordered list, the applying the one or more new change sets to the local instance of the data store comprising:
      performing, by using a computer system, one or more add, modify or delete operations included in the one or more new changes set with respect to one or more corresponding entities in the local instance of the data store.

2. The method of claim 1, wherein the method is performed upon determining that the shared version of the dataset is a more recently-updated version of the dataset than the local version of the dataset.

3. The method of claim 1, further comprising:
   obtaining the shared version of the dataset from one of a file sharing system, a networked server, a Web service, or a cloud-based service.

4. The method of claim 1, further comprising:
   overwriting the local version of the dataset with the shared version of the dataset or updating the local version of the dataset based on the shared version of the dataset.

5. The method of claim 1, wherein the shared version of the dataset comprises one of a plurality of shared versions of the dataset that can each be accessed to synchronize an instance of the data store to a desired change state.

6. The method of claim 1, wherein each version of the dataset comprises a file that includes a sequentially-ordered list of change sets associated with the data store.

7. The method of claim 1, wherein each version of the dataset comprises a database that stores change sets associated with the data store.

8. The method of claim 1, wherein the local instance of the data store includes one or more entities that represent one or more user settings associated with a program.

9. A system comprising:
   a file sharing system that maintains a shared version of a dataset; and
   a client machine that maintains a local version of the dataset and a local instance of a data store, the client machine including at least one processor that is configured to:
      obtain the shared version of the dataset from the file sharing system;
      compare the local version of the dataset, that includes a first sequentially-ordered list of change sets associated with the local instance of the data store, to the shared version of the dataset, that includes a second sequentially-ordered list of change sets associated with at least one remote instance of the data store, to identify one or more new change sets that are included in the shared version of the dataset and are not included in the local version of the dataset, the one or more new change sets comprising a set of operations that represent how a state of a corresponding set of entities in the local instance of the data store must be changed to bring the local instance of the data store into synchronization with the at least one remote instance of the data store, and the one or more new change sets having been automatically modified to ensure that only a single operation is included in the set of operations for each entity in the corresponding set of entities; and
      apply the one or more new change sets to the local instance of the data store in the order in which the one or more new change sets appear in the second sequentially-ordered list, the applying the one or more new change sets to the local instance of the data store including performing one or more add, modify or delete operations included in the one or more new change sets with respect to one or more corresponding entities in the local instance of the data store.

10. The system of claim 9, wherein the at least one processor of the client machine is further configured to overwrite the local version of the dataset with the shared version of the dataset or update the local version of the dataset based on the shared version of the dataset.

11. The system of claim 10, wherein the at least one processor of the client machine is further configured to perform the following in response to determining that the local instance of the data store has been modified subsequent to the overwriting of the local version of the dataset with the shared version of the dataset or the updating of the local version of the dataset based on the shared version of the dataset:
   add a further new change set to the local version of the dataset; and
   provide the local version of the dataset that includes the further new change set to the file sharing system.

12. The system of claim 9, wherein the at least one processor of the client machine is configured to perform the obtaining, comparing, and applying operations only upon determining that the shared version of the dataset is a more recently-updated version of the dataset than the local version of the dataset.

13. The system of claim 9, wherein the shared version of the dataset comprises one of a plurality of shared versions of the dataset that can be accessed to synchronize an instance of the data store to a desired change state.

14. The system of claim 9, wherein each version of the dataset comprises a file that includes a sequentially-ordered list of change sets associated with the data store.

15. The system of claim 9, wherein each version of the dataset comprises a database that stores change sets associated with the data store.

16. The system of claim 9, wherein the local instance of the data store includes one or more entities that represent one or more user settings associated with a program.

17. A device comprising:
a processing unit;
a memory communicatively connected to the processing unit, the memory storing instructions that are executable by the processing unit to perform operations, the operations including:
comparing a local version of a dataset, that includes a first sequentially-ordered list of change sets associated with a local instance of a data store, to a shared version of the dataset, that includes a second sequentially-ordered list of change sets associated with at least one remote instance of the data store, to identify one or more new change sets that are included in the shared version of the dataset and are not included in the local version of the dataset, the one or more new change sets comprising a set of operations that represent how a state of a corresponding set of entities in the local instance of the data store must be changed to bring the local instance of the data store into synchronization with the at least one remote instance of the data store, and the one or more new change sets having been automatically modified to ensure that only a single operation is included in the set of operations for each entity in the corresponding set of entities; and
applying the one or more new change sets to the local instance of the data store in the order in which the one or more new change sets appear in the second sequentially-ordered list, the applying the one or more new change sets to the local instance of the data store comprising:
performing one or more add, modify or delete operations included in the one or more new change sets with respect to one or more corresponding entities in the local instance of the data store.

18. The device of claim 17, wherein the operations further include:
obtaining the shared version of the dataset from one of a file sharing system, a networked server, a Web service, or a cloud-based service.

\* \* \* \* \*